United States Patent [19]

Keyes et al.

[11] 3,839,309

[45] Oct. 1, 1974

[54] POLYACRYLAMIDE DERIVATIVES AND METHOD OF INSOLUBILIZING ENZYMES THEREWITH

[75] Inventors: Melvin H. Keyes, Sylvania; Frank E. Semersky, Oregon, both of Ohio

[73] Assignee: Owens-Illinois, Inc., Toledo, Ohio

[22] Filed: Oct. 2, 1972

[21] Appl. No.: 294,339

[52] U.S. Cl............ 260/89.7 S, 195/68, 260/80.3 R, 260/89.7 R, 260/307 B
[51] Int. Cl. ............................................ C08f 15/00
[58] Field of Search ....... 260/307 B, 89.7 S, 80.3 R, 260/89.7 R, 89.7 N

[56] References Cited
UNITED STATES PATENTS
2,508,718 5/1950 Jones............................ 260/89.7 X

*Primary Examiner*—Joseph L. Schofer
*Assistant Examiner*—Herbert J. Lilling
*Attorney, Agent, or Firm*—Henry P. Stevens; Edward J. Holler

[57] ABSTRACT

New compositions of matter comprising modified polyacrylamide and lower alkyl derivatives thereof in which one of the hydrogens in a minor portion of the amide groups is substituted by an alkylene-2,5-dioxo-4-oxazolidine are disclosed which are useful for insolubilizing enzymes.

9 Claims, No Drawings

POLYACRYLAMIDE DERIVATIVES AND METHOD OF INSOLUBILIZING ENZYMES THEREWITH

BACKGROUND OF THE INVENTION

An enzyme is defined as a biological catalyst capable of initiating, promoting and governing a chemical reaction without being consumed in the process or becoming part of the product formed. All enzymes are proteins and as such are sensitive to high temperatures, changes in pH, microbial attack and hydrolysis. Enzymes are synthesized by plants, animals and microorganisms and can be isolated from such diverse sources as figs, pineapples, and hog pancreas as well as microbial cells such as Aspergillus oryzae.

Enzymes have been used since prebiblical times to make bread, cheese and wine. More progress has been made in enzyme production and application in the past 100 years than in the previous 5,000 years. About $30 million worth of enzymes were marketed in the United States alone in 1964 and this figure is steadily increasing since enzymes can be used to produce not only food and beverages but pharmaceuticals, adhesives, paper and textiles.

Only a small percentage of animal and plant tissue is composed of enzymes which makes extraction procedures very costly. Furthermore, most enzymes are water soluble so that when used as catalysts they are difficult to remove from the finished product and cannot be reused. As a result, much effort has been expended in recent years to immobilize enzymes so that they can be used in continuous flow reactions or readily separate from the finished product in batch reactions and reused.

There are three principal methods for binding enzymes to matrixes such as cross-linked dextran gels, acrylic polymers, polyamino acids, cellulose or glass. These include covalent chemical binding, adsorption and entrapment of the enzyme within a gel lattice. A less common method involves converting the enzyme itself into an insoluble matrix by using bifunctional compounds to cross-link the enzyme into a large aggregate.

In U.S. Pat. No. 2,508,718, mono-N-methacryl-lysine is prepared by the reaction of methacryl chloride and lysine. When this product is placed under ultraviolet light, it polymerizes to poly-N-methacryl-lysine which is water soluble and has excellent protective colloid action. U.S. Pat. No. 3,459,760 discloses the reaction of a halomercuric salt of lysine with phosgene to produce the corresponding 2,5-oxazolidinedione derivative. However, no composition of polyacrylamide or lower alkyl derivatives thereof and said dione derivative has heretofore appeared in the literature which would be water insoluble and useful in rendering enzymes water insoluble.

SUMMARY OF THE INVENTION

This invention is directed to novel compositions of matter comprising polyacrylamide or lower alkyl derivatives thereof in which one of the hydrogens in less than 50 percent of the amide groups is replaced by an alkylene-2,5-dioxo-4-oxazolidine in which the alkylene group contains from one to eight carbon atoms. These products have utility in that they can be reacted with enzymes such as ribonuclease, peroxidase, trypsin or glutamicpyruvic transaminase and the like to render them water insoluble.

The polyacrylamide derivatives of the present invention can be prepared as shown in the following sequence of reactions wherein R is hydrogen or lower alkyl containing from one to four carbon atoms and alk is an alkylene group of from one to eight carbon atoms:

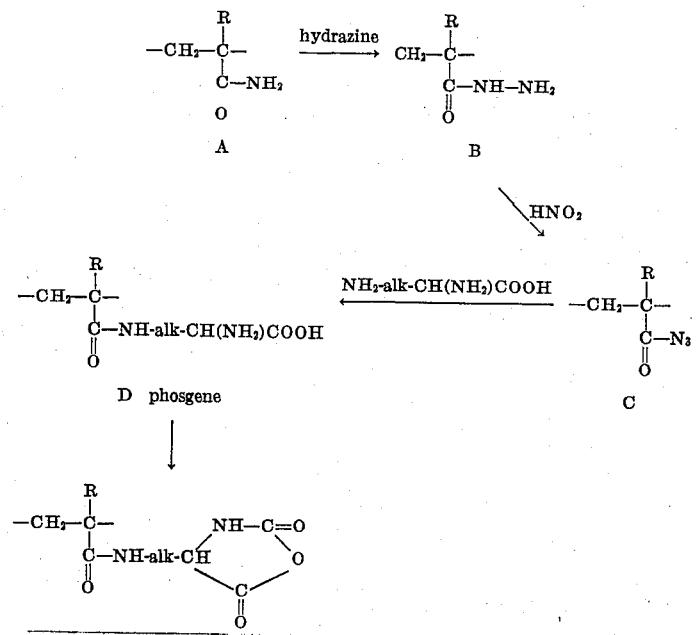

In the first step of the reaction the polyacrylamide and hydrazine in water are heated at about 45°C. for about 15 hours to form the corresponding hydrazide derivative of formula B which is reacted with nitrous acid at 0°C. to form the azide of formula C. This azide is further reacted at 0°C. with a diaminoacid of the formula $NH_2$—alk—$CH(NH_2)COOH$ to obtain the derivative of formula D which is cyclized with phosgene at about 35°C. resulting in the compound represented by formula E.

DESCRIPTION OF THE PREFERRED EMBODIMENTS

The following examples illustrate the preparation of the new polyacrylamide derivatives and their use in rendering enzymes water insoluble.

EXAMPLE 1

Five grams of dry polyacrylamide and 6 grams (0.12 mole) of hydrazine hydrate in 200 ml. of water were heated at 45°C. for 15 hours. The hydrazide which formed was washed with a 0.1 molar sodium chloride solution and then suspended in 200 ml. of 0.25 normal hydrochloric acid. The suspension was cooled to 0°C. and 25 ml. of 1 molar sodium nitrite solution was added. To the azide thus formed were added 18 grams (0.12 mole) of lysine slowly over a period of 5 minutes with vigorous stirring. After one hour, the lysine derivative formed was washed successively with 100 ml. of 0.1 molar NaCl, 40 ml. of 1 molar $NH_4OH$ plus 10 ml. of 1 molar $NH_4Cl$ and distilled water, then dried at 110°C. In the final step, three grams of the lysine derivatives were mixed with 75 ml. of dioxane and phosgene was bubbled through the mixture with constant stirring for 5 hours at 40°C. followed by purging with dry air for 15 hours at 25°C. The desired modified polyacrylamide was separated by filtration as a white solid and dried.

The lysine derivative of step 3 was quantitatively analyzed for amino acid side chains by adding one gram of said derivative to 3 ml. of distilled water and mixing with 0.5 ml. of 0.1 molar $CuCl_2$. After stirring for 30 minutes, the mixture was centrifuged and 1 ml. of the supernatant was mixed with 3 ml. of 0.05 molar ethylenediaminetetraacetic acid. The optical absorbance of the resulting solution was measured at 740 nanometers and the concentration determined from a calibration curve. If no cupric ions are detected, another aliquot of $CuCl_2$ solution is added as described above and the absorbance is again measured. The difference between the moles of $CuCl_2$ added to the lysine derivative and the moles of $CuCl_2$ present in the supernatant solution is equal to the number of moles of cupric ion complexed with the amino acid side chains in said derivative. The extent of lysine substitution was found to be 6 mole percent.

The percentage of N-tetramethylene-2,5-dioxo-oxazolidine substitution in the final product was obtained indirectly by determining the amount of lysine which was not cyclized by phosgene in step 4 and subtracting this amount from 6 mole percent. Thus, the product of step 4 was reacted with t-butyl amine to open the ring and form an N-t-butyl amide group which does not form a chelated complex with the cupric ion at the low $CuCl_2$ concentration used. Upon the addition of cupric chloride to an aqueous dispersion of the t-butyl amine product, only the amino acid sites on the lysine derivative of step 3 which had not been cyclized are available for complexing. The same procedure as previously described was then used to determine that only one-third of the lysine sites had not been cyclized in step 4 so that the total amount of substitution in the final product was 4 mole percent.

EXAMPLE 2

Five milliliters of a solution containing 1.5 milligrams of ribonuclease per milliliter of water was saturated with 0.1 molar $NaHCO_3$ and cooled to 0°C. To this solution was added with stirring 120 milligrams of the modified polyacrylamide prepared in Example 1. Thereafter, stirring was continued at 0°C. for 24 hours. In this manner, the ribonuclease was rendered water insoluble and after washing with water, it was stored at 3°C. This sample was assayed initially and periodically by packing in a chromatographic column and measuring the rate of change of cytidine-2',3'-cyclic phosphate to cytidine monophosphate by the method of Hammes and Walz as described in Biochim. Biophys. Acta, 198, 604 (1970). The initial activity was 0.283 mg. of ribonuclease per gram of modified polyacrylamide. Eight months later, 0.071 mg. of ribonuclease was present per gram of modified polyacrylamide.

EXAMPLE 3

Five milligrams of chymotrypsin were dissolved in 10 ml. of water and 4 ml. of the solution were mixed with 25 mg. of the modified polyacrylamide prepared in Example 1. The resulting mixture was saturated with $NaHCO_3$ and after 3 hours, the volume was increased to 10 ml. with water before measuring the absorbance. The activity of the insolubilized chymotrypsin was measured by the method described by Hummel, Can. J. Biochem. Physiol., 37, 1393 (1959) using benzoyl tyrosine ethyl ester as a substrate. It was found that 1.0 mg. of chymotrypsin was initially present per gram of modified polyacrylamide. The assay was repeated seven times over a period of several months and 10 percent of the activity remained after five months.

EXAMPLE 4

Three milligrams of the modified polyacrylamide of Example 1 was mixed with 20 ml. of aqueous $5 \times 10^{-5}$ molar horseradish peroxidase solution saturated with $Na_2CO_3$ at 0°C. and stirred for 20 hours. The insolubilized peroxidase formed had an activity of 0.01 mg. per gram of modified polyacrylamide and readily catalyzed the reaction of guaiacol and hydrogen peroxide to tetraguaiacol and water. Substantially all of the activity was retained when the same reaction was repeated several months later.

By substituting the polyacrylamide of Example 1 with polymethacrylamide, polyethacrylamide, polypropylacrylamide and polybutacrylamide, the corresponding modified polymers are obtained which when reacted with a water soluble hydrolytic enzyme such as papain or trypsin or alternatively, with a transferase enzyme such as glutamicpyruvic transaminase will render said enzymes water insoluble.

Although lysine was employed in Example 1 as a specific embodiment of the invention, it will be apparent to those skilled in the art that any diaminoacid of the formula $NH_2$—alk—$CH(NH_2)COOH$ wherein alk is an alkylene group of from one to eight carbon atoms can be substituted for lysine with equally effective results. Compounds resulting from the reactions of such acids with polyacrylazide or R-substituted derivatives thereof followed by cyclization with phosgene are all considered to be within the scope of the present invention.

We claim:

1. A modified polyacrylamide of the formula

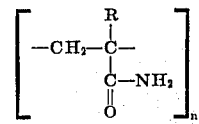

wherein R is a member of the group consisting of hydrogen and lower alkyl of from one to four carbon atoms in which one of the hydrogens in a minor portion of the amide groups is substituted by an alkylene-2,5-dioxo-4-oxazolidine in which the alkylene group contains from one to eight carbon atoms.

2. An amide as in claim 1 in which R is hydrogen.
3. An amide as in claim 1 in which R is methyl.
4. An amide as in claim 1 in which R is ethyl.
5. An amide as in claim 1 in which R is propyl.
6. An amide as in claim 1 in which R is butyl.
7. An amide as in claim 1 in which one of the hydrogens in at least 4 percent of the amide groups is substituted by tetramethylene-2,5-dioxo-4-oxazolidine.

8. A method of preparing a modified polyacrylamide as in claim 1 which comprises the steps of heating a polyacrylamide with hydrazine to form the corresponding hydrazide, reacting said hydrazide with nitrous acid to form an azide, reacting said azide with a diaminoacid of the formula $NH_2$—alk—$CH(NH_2)COOH$ in which alk is an alkylene group of from one to eight carbon atoms to form an intermediate which is then reacted with phosgene to induce cyclization and recovering the resultant product.

9. A method as in claim 8 in which the diaminoacid employed is lysine.

\* \* \* \* \*